United States Patent [19]
Hattori et al.

[11] 3,923,380
[45] Dec. 2, 1975

[54] ELECTROOPTIC MODULATOR UTILIZING MULTIPLE INTERFERENCE

[75] Inventors: Shuzo Hattori; Tadao Hiramatsu, both of Nagoya, Japan

[73] Assignee: Hagiwara Denki Kabushiki Kaisha, Nagoya, Japan

[22] Filed: Mar. 8, 1974

[21] Appl. No.: 449,522

[30] Foreign Application Priority Data
Mar. 12, 1973 Japan................................ 48-28825

[52] U.S. Cl......... 350/160 R; 332/7.51; 350/162 R; 356/112
[51] Int. Cl.[2] ...................... G02F 1/32; G02F 1/38
[58] Field of Search..... 356/112; 350/160 R, 162 R; 332/7.51

[56] References Cited
UNITED STATES PATENTS
3,736,045   5/1973   Heidrich et al. ................. 350/160 R
3,813,142   5/1974   Buhrer............................ 350/160 R OTHER PUBLICATIONS
"Analysis of a Interferometer with Acoustic Surface Waves on One Mirror;" Hunsinger; Applied Optics; Vol. 10 No. 2; Feb. 1971; pp. 390–395.

*Primary Examiner*—Vincent P. McGraw
*Attorney, Agent, or Firm*—Berman, Aisenberg & Platt

[57] ABSTRACT

An electrooptic crystal has a pair of parallel surfaces of y-z plane both of which surfaces are deposited with half mirror layers and on one of which are provided interdigital electrodes extending in y-direction and spaced apart from one to another in z-direction. To the electrode pair is applied a modulating signal voltage to form in the crystal an electrostatic field which is spatially periodic in z-direction having an intensity proportional to the modulating signal voltage and uniform in y-direction. A coherent light beam is projected into the crystal from the non-electroded y-z surface through the half mirror layer. The light beam propagates in the crystal in x-direction repeatedly reflected by the both surfaces thereby subjected to multiple interference leakingly comes out from the electroded surface through the half mirror layer directing in separate directions. A slit permits a beam of the light to come out whose intensity is varied in accordance with the modulating signal voltage. This modulator is constructed of a simple input and output optical system, requiring only an easy adjustment for the incident light.

4 Claims, 8 Drawing Figures

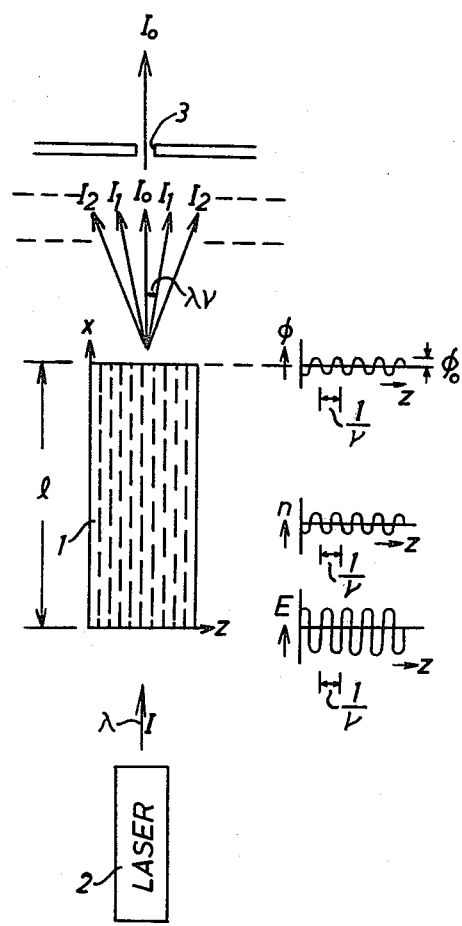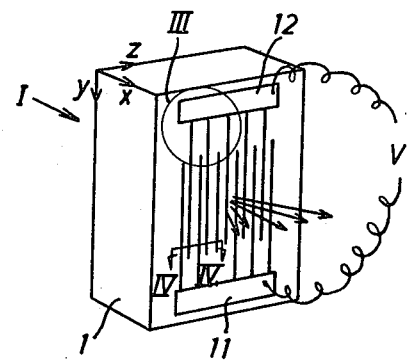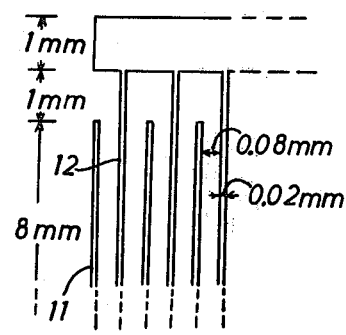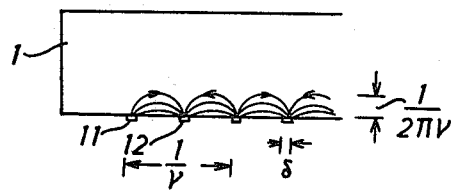

ELECTROOPTIC MODULATOR UTILIZING MULTIPLE INTERFERENCE

BACKGROUND OF THE INVENTION

This invention relates to an electrooptic modulator and more particularly to an electrooptic modulator of a diffraction type.

As a coherent light beam is incident in the medium wherein the propagation speed of the light wave is made periodically varied spatially in the direction perpendicular to the propagating direction of the light wave, the light beam is caused to be diffracted into orders emerging in separate directions. The intensities of the respective emergent beams are responsive to the amount of the spatial speed variation which originates from the modulation signal voltage applied to the interdigital electrodes provided on the surface of the electrooptic medium. In such a diffraction phenomenon the diffraction angles of the respective emergent beams are inversely proportional to the pitch of the spatially periodic electric field, and therefore the pitch should preferably be as small as a fraction of a millimeter to obtain a practically sufficient separation of the respective orders of emergent beams. But as it is known that such a periodic electric field concentrates within a depth of $\frac{1}{2\pi}$ times the pitch, the region where the periodic electric field substantially exists consequently becomes very thin. Therefore in this type of an electrooptic modulator, the sufficient variations of the respective light beam intensities for the actually practical light modulator requires the light beam to propagate as long as there is a sufficient distance through the very thin portion where the electric field is concentrated.

SUMMARY OF THE INVENTION

An object of this invention is to provide a diffraction type electrooptic modulator which is so contrived that the light propagates as long as possible through the spatially periodic electric field in an electrooptic crystal.

Another object of the invention is to provide a diffraction type electrooptic modulator wherein the light wave propagates repeatedly back and forth many times in the same electrooptic crystal and consequently many times in the region where the periodic electric field exists, and comes out from the crystal as a superposed leakage of the repeatedly reflected light utilizing interference phenomena.

Further object of the invention is to provide a diffraction type electrooptic modulator which requires easy conditions for adjustment against the incident light beam and can be constructed with a simple electroded crystal and a simple input and output optical system.

According to an aspect of this invention, an electrooptic crystal has on its one surface interdigital electrodes arranged parallel to and spaced apart from each other. The electrodes are charged with a positive and a negative electric potential spatially alternately one after another to form a spatially periodic electric field concentrated in the region of the crystal near the electroded surface. The light beam propagates in the crystal back and forth plural times being reflected repeatedly so as to travel through the region where the electric field exists many times. The light beam leaks out little by little at the respective reflection, and the leakages are superposed to present a so-called multiple interference, which is substantially equivalent to the fact that the light has passed so many times through the electric field. Thus, there can be obtained an emergent light beam which has been given a sufficient amount of spatially periodic phase difference.

BRIEF DESCRIPTION OF THE DRAWINGS

Other objects and features of the present invention will become more apparent form the description made hereinbelow with respect to preferred embodiments thereof in conjunction with the accompanying drawings in which:

FIG. 1 is a schematic plan view illustrating fundamental functions of an electrooptic diffraction modulator;

FIG. 2 is a perspective view illustrating schematically an example of an electrooptic crystal as a modulator element according to this invention;

FIG. 3 is an enlarged front view of the crystal at the portion as is shown in a circle III in FIG. 2;

FIG. 4 is an enlarged cross sectional view of the crystal at the portion as is shown by arrows IV — IV in FIG. 2;

DESCRIPTION OF THE PREFERRED EMBODIMENTS

Figure 5:
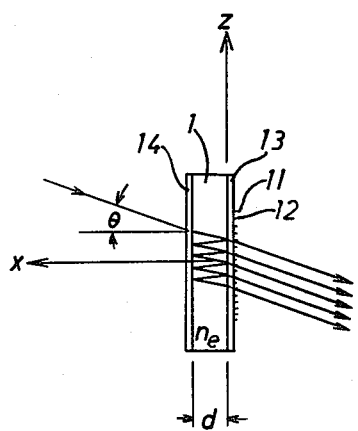
FIG. 5 is a cross sectional plan view of the crystal illustrating the phenomenon of multiple interference.

Referring now to FIG. 1, there are explained fundamental functions of the electrooptic diffraction modulator wherein the refractive index of the crystal is given a spatially periodic difference and consequently the phase of the emergent light beam has a spatially periodic difference so that the emergent light propagates in a plurality of different directions. In an electrooptic crystal 1 is produced a spatially periodic electric field E which is $$E = E_1 \sin 2\pi\nu z \tag{1}$$

spatially periodically varying in z-direction with a variation pitch $1/\nu$. Consequently, there is produced as a result of the electrooptic effect a spatially periodic variation of the refractive index with the same variation pitch $b/\nu$ in z-direction. In case of an electrooptic crystal of 3m-symmetry with its c-axis taken as the z-axis, the deviation amount $\Delta n$ of the refractive index from the normal refractive index $n_e$ under no electric field is $$\Delta n = \frac{1}{2} n_e^3 r_{33} E_1 \sin 2\pi\nu z \tag{2}$$

A laser 2 emits a light beam having a wave length $\Delta$ and an intensity I, which beam is incident upon the electrooptic crystal 1 to propagate therein as long as a length $l$ in x-direction to become a plane wave having a spatially periodic phase $$\phi = \pi n_e^3 r_{33} \frac{l}{\lambda} E_1 \sin 2\pi\nu z \equiv \phi_1 \sin 2\pi\nu z \tag{3}$$

varying in z-direction with the same variation pitch $1/\nu$. This plane wave can be resolved into a plurality of uniform plane waves each propagating in a direction of an angle $\theta_m$ $$\theta_m = m\nu\Delta \qquad (4)$$

from the non-diffracted straight direction, and having an intensity $I_m$ $$I_m = I \cdot J_m^2(\phi_1) \qquad (5)$$

where $m$ is the diffraction order taking a value of $0, \pm 1, \pm 2, \ldots$ and $J_m$ is the $m$-th order Bessel function of the first kind. The respective orders of the diffracted light beams can be separately taken out by a slit 3 which is positioned sufficiently apart from the electrooptic crystal. In FIG. 1 the zero-order beam is taken out. The intensity of each order output beam is of a value determined by the equation (5) in response to the amplitude value $E_1$ of the spatially periodic electric field. Where the electric field variation amplitude $E_1$ is varied in accordance with the modulating signal wave, the emergent light beams are of intensity modulated ones in accordance therewith. When the field $E_1$ is different at positions as a function of a distance $s$ measured along the light propagating direction, the $\phi_1$ in FIG. 3 is expressed as $$\phi_1 = \pi \frac{n_e^3 r_{33}}{\lambda} \int_0^l E_1(s)ds \qquad (3a)$$

in the form of integration.

An example of the electrode construction for producing in the crystal an electric field E varying spatially periodically in z-direction is illustrated in FIGS. 2 to 4. The electrodes are metal layers deposited on the $z$–$y$ surface of the crystal by, for example, photolithography in the form of parallel strips of a width elongated in $y$-direction and equally spaced apart from each other in $z$-direction, $2\nu$ strips existing per unit length, wherein every other strips are connected together to form the electrodes 11 and 12. Across the electrodes 11 and 12 is applied a voltage V. The actual dimensions of the electrodes are shown in FIG. 3 as an enlarged portion III of FIG. 2. The electric field distribution is schematically illustrated in FIG. 4 as an enlarged view at a cross section IV—IV of FIG. 2 parallel to $x$–$z$ plane. Assuming that most of electrooptic cyrstals have sufficiently large relative permittivity (lithiumtantalate has $\epsilon_e/\epsilon_o=43$) and that the electric potential displacement concentrates in the crystal rather than out thereof, the electric field distribution is analyzed to express the z-directional component of the spatially periodic variation in the form of Fourier series, the fundamental frequency term being $$E = \frac{8}{\pi} \cdot \frac{\cos\pi\nu\delta}{1-2\nu\delta} \nu V \cdot e^{-2\pi\nu x} \cdot \sin 2\pi\nu z \qquad (6)$$
$$E_1 \sin 2\pi\nu z$$

As apparent from the equation (6), the spatially periodic electric field in z-direction constitutes a skin field concentrated substantially within the dept of $1/2\pi\nu$ from the surface. Therefore, the light beam I passing through the crystal merely one time to the direction shown by the arrow is to travel too short a distance of the portion where the electrooptic effect is acting to be separated sufficiently in the propagating directions. This invention is to improve this point by utilizing multiple interference.

In FIG. 5 is illustrated a principle of multiple interference as one of the ways to magnify the effect of the skin field upon the spatially periodic variation of the phase of the light wave.

Figure 6:
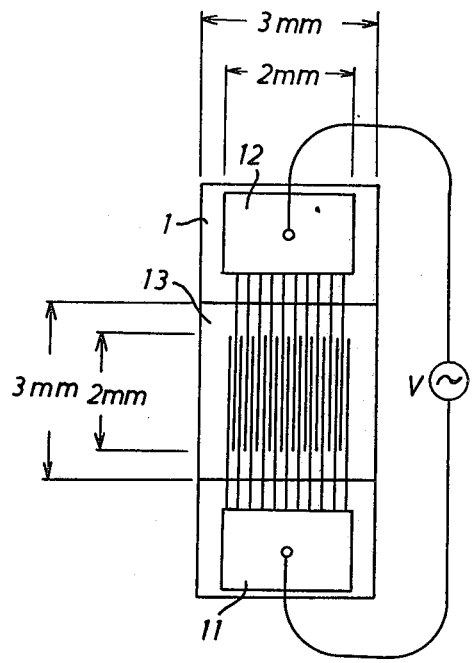
FIG. 6 is a front view of the crystal shown in FIG. 5.

An example of the electrode construction for such a device is illustrated in FIG. 6 as viewed from the emergent side of light. An electrooptic crystal 1 has its two surfaces perpendicular to the $x$-axis finished flat and parallel to the degree of one hundredth or less of the wave length. Partially transmitting reflector films 13 and 14 are deposited on the two surfaces perpendicular to the $x$-axis. The partially transmitting reflector film is constituted by a dielectric multilayer reflector made of two kinds of dielectric materials having refractive indexes $n_h$ and $n_l$ respectively with the ratio $n_h/n_l$ being as large as possible, which materials are alternately deposited by vacuum evaporation up to seven to fifteen layers, each layer having a thickness corresponding to a quarter-wavelength. The reflection factor $P^2$, scattering loss $s$, absorption loss $a$ and transmission factor $t$ have the following relation:

$$P^2 + s + a + t = 1 \approx P^2 + \Delta \qquad (7)$$

In case of a dielectric multilayer reflector with $P^2 = 0.995$ it is possible that $t \geq 0.004$ and therefore $s + a < 0.001$ as is known with a dielectric multilayer film used for a laser reflector. A linear polarized parallel light beam having its electric vector $F_0$ in z-axis direction enters the partially transmitting reflector film 14 from air with an angle $\theta$ and the amount $t$ of the incident energy travels through the crystal and enters the partially transmitting reflector film 13 with an incident angle $\beta$, where $$n_e \cdot \sin\beta = \sin\theta \qquad (8)$$

The first transmission output of the light beam which has passed the reflector films 14 and 13 amounts to $t^2$ of the originally incident energy. The electric vector of the first transmission output of a value $tF_0$. The reflector film 13 reflects $P^2$ of the energy, and the reflector film 14 reflects further $P^2$ thereof, and the amount $t$ thereof further passes the film 13 to become a second transmission output light beam. Taking phase difference between the first transmission output and the second transmission output as $\phi$, the electric vector $F_1$ of the second transmission output is given as $$F_1 = t \cdot P^2 \cdot F_0 \cdot e^{i\phi} \qquad (9)$$

The same is repeated to obtain an $(m+1)$-th transmission output having an electric vector $F_m$ $$F_m = t \cdot P^{2m} \cdot F_0 \cdot e^{im\phi} \qquad (10)$$

The value $\phi$ is divided into a phase difference $\phi 0 + 2\pi N$ under no skin field and a phase difference $\phi_1 \sin 2\pi\nu z$ occurred due to the skin field and expressed as $$\theta = \phi 0 + \phi_1 \sin 2\pi\nu z + 2\pi N \qquad (11)$$

First, the phenomenon of repeated interference under no skin field is explained hereinbelow. The difference between the travelling distance of the first transmission output light and that of the second as converted into equivalent values in vacuum is $$2dn_e \cdot \frac{1}{\cos\phi} - 2d \cdot \tan\phi \cdot \sin\theta = 2dn_e \cdot \left(1 - \frac{\sin^2\theta}{n_e^2}\right)^{1/2}$$

where $d$ is the thickness of the electrooptic crystal 1, and therefore $$\phi_o = \frac{2\pi}{\lambda} 2dn_e \left(1 - \frac{\sin^2\theta}{n_e^2}\right)^{1/2} - 2\pi N$$

$$\cong 2\pi \left(\frac{2dn_e}{\lambda} - N\right) - 2\pi \cdot \frac{d}{\lambda} \cdot \frac{\theta^2}{n_e} \qquad (12)$$

The electric vector F of the total transmission output light is $$F = \sum_{m=0}^{\infty} F_m = tF_0 \sum_{m=0}^{\infty} p^{2m} \cdot e^{im\phi_0}$$

$$= \frac{tF_0}{1 - p^2 \cdot e^{i\phi_0}} \quad (13)$$

The transmitted energy as a result of interference is proportional to $|F|^2$ which is $$|F|^2 = |F_0|^2 \frac{t^2}{(1 - P^2\cos\phi_0)^2 + P^4\sin^2\phi_0}$$

$$= |F_0|^2 \cdot \frac{t^2}{t + S + a} \cdot \frac{1}{1 + \frac{2P^2}{(1-P^2)^2}(1 - \cos\phi_0)} \quad (14)$$

When considering the aforementioned examples of numerical values, it can be understood that a substantial part of the incident energy light is transmitted when $\phi_0 = 0$, but the transmitted light decreases rapidly as $100\phi_0$ increases even a little. The phase difference $(\Delta\phi_0)_{1/2}$ at which the transmitted energy becomes ½ under condition of $\phi_0 = 0$ is $$1 = \frac{2P^2}{(1-P^2)^2} \cdot [1 - \cos(\Delta\phi_0)_{1/2}] \cong \frac{2P^2}{(1-P^2)^2} \cdot \frac{(\Delta\phi_0)_{1/2}^2}{2}$$

$$\therefore (\Delta\phi_0)_{1/2} = \frac{1 - P^2}{P} \quad (15)$$

A value obtained by dividing $2\pi$ by the difference between the two points $\pm(\Delta\phi_0)_{1/2}$ at which the transmitted energy becomes ½ is called finess $q$, namely $$q = \frac{\pi P}{1 - P^2} \quad (16)$$

In equation (12), where $(2dn_e/\lambda - N) = 0$, the tolerable maximum inclination $\Delta\theta$ of the incident angle for the transmitted energy to be larger than ½ of the optimum value is $$(\Delta\theta_0)_{1/2} = 2\pi \frac{d}{\lambda} \cdot \frac{(\Delta\theta)^2}{n_e}$$

$$\therefore (\Delta\theta) = \left(\frac{\lambda n_e}{2qd}\right)^{1/2} \quad (17)$$

Second, the effect of the skin electric field having a spatially periodic variation is explained hereinbelow. In this analysis, the electric vector F of the total transmitted light is expressed by putting $\phi$ of the equation (11) in place of $\phi_0$ in the equation (13) as $$F = \frac{tF_0}{1 - P^2 e^{i(\phi_0 + \phi_1 \sin 2\pi\nu z)}} \quad (18)$$

where $\phi_1$ is an amplitude of phase variation imparted by the skin electric field while the light wave travels two-way between the partially transmitting reflector 13 and 14. In this case $s$ in the equation (3a) can be approximately substituted by $x$ and the locus of integration is from $c$ to $d$ and back. Assuming that $2\pi\nu d \gg 1$, $\phi_1$ is well approximated as $$\phi_1 = 2\pi \frac{n_e r_{33}}{\lambda} \cdot \int_0^\infty E_1(x) dx \quad (3b)$$

Putting the definition by the equation (6) in the equation (3b) and defining $$V'_\pi = \frac{\lambda}{n_e^3 r_{33}} \quad (19)$$

just as the half-wavelength voltage in case of transverse field modulator, there is obtained $$\phi_1 = \frac{8}{\pi} \cdot \frac{\cos\pi\nu\delta}{1 - 2\nu\delta} \cdot \frac{V}{V'_\pi} \quad (20)$$

With respect to the case where the phase is spatially periodic as given by the equation (3), the equation (5) has been obtained by considering the nature that the squares of absolute values of the respective coefficients of Fourier series representing the electric field of the emergent light in terms of $\sin 2\pi m\nu z$ are proportional to the respective intensities of the uniform plane waves propagating in the directions given by the equation (4). Applying this method for the case of the multiple interference, the equation (18) will be $$F = tF_0(C_0 + \sum_{k=1}^{\infty} C_k \cos 2\pi k\nu z + \sum_{k=1}^{\infty} S_k \sin 2\pi k\nu z) \quad (21)$$

where $$C_0 = \frac{1}{\omega tF_0} \cdot \int_0^\omega F dz \quad (22a)$$

$$C_k = \frac{2}{\omega tF_0} \cdot \int_0^\omega F \cos 2\pi k\nu z dz \quad (22b)$$

$$S_k = \frac{2}{\omega tF_0} \cdot \int_0^\omega F \sin 2\pi k\nu z dz \quad (22c)$$

Referring to the equation (7), we have $$\frac{F}{tF_0} = \frac{1}{1 - (1-\Delta)e^{i(\phi_0 + \phi_1 \sin 2\pi\nu z)}}$$

$$= \frac{\Delta + 2(1-\Delta)\sin^2\frac{1}{2}(\phi_0 + \phi_1 \sin 2\pi\nu z)}{\Delta^2 + 4(1-\Delta)\sin^2\frac{1}{2}(\phi_0 + \phi_1 \sin 2\pi\nu z)}$$

$$+ i \frac{(1-\Delta)\sin(\phi_0 + \phi_1 \sin 2\pi\nu z)}{\Delta^2 + 4(1-\Delta)\sin^2\{(\phi_0 + \phi_1 \sin 2\pi\nu z)\cdot\frac{1}{2}\}} \quad (23)$$

After the conversion of
$$2\pi\nu z = \xi \quad (24)$$
the integration result of the equation (22) gives, for example $$C_0 = \frac{1}{2\pi}\int_0^{2\pi} \frac{\Delta + 2(1-\Delta)\sin^2\frac{1}{2}(\phi_0 + \phi_1\sin\xi)}{\Delta^2 + 4(1-\Delta)\sin^2\frac{1}{2}(\phi_0 + \phi_1\sin\xi)} d\xi$$

$$+ \frac{i}{2\pi}\int_0^{2\pi} \frac{(1-\Delta)\sin(\phi_0 + \phi_1\sin\xi)}{\Delta^2 + 4(1-\Delta)\sin^2\frac{1}{2}(\phi_0 + \phi_1\sin\xi)} d\xi \quad (25a)$$

$$C_1 = \frac{1}{\pi}\int_0^{2\pi} \frac{\{\Delta + 2(1-\Delta)\sin^2\frac{1}{2}(\phi_0 + \phi_1\sin\xi)\}\cos\xi}{\Delta^2 + 4(1-\Delta)\sin^2\frac{1}{2}(\phi_0 + \phi_1\sin\xi)} d\xi$$

$$+ \frac{i}{\pi}\int_0^{2\pi} \frac{(1-\Delta)\sin(\phi_0 + \phi_1\sin\xi)\cos\xi}{\Delta^2 + 4(1-\Delta)\sin^2\frac{1}{2}(\phi_0 + \phi_1\sin\xi)} d\xi \quad (25b)$$

$$S_1 = \frac{1}{\pi}\int_0^{2\pi} \frac{\{\Delta + 2(1-\Delta)\sin^2\frac{1}{2}(\phi_0 + \phi_1\sin\xi)\}\sin\xi}{\Delta^2 + 4(1-\Delta)\sin^2\frac{1}{2}(\phi_0 + \phi_1\sin\xi)} d\xi$$

$$+ \frac{i}{\pi}\int_0^{2\pi} \frac{(1-\Delta)\sin(\phi_0 + \phi_1\sin\xi)\cos\xi}{\Delta^2 + 4(1-\Delta)\sin^2\frac{1}{2}(\phi_0 + \phi_1\sin\xi)} d\xi \quad (25c)$$

When $\phi_0 = 0$, the equations (25) are simplified as $$C_0 = \frac{1}{2\pi}\int_0^{2\pi} \frac{\Delta + 2(1-\Delta)\sin^2(\frac{1}{2}\phi_1\sin\xi)}{\Delta^2 + 4(1-\Delta)\sin^2(\frac{1}{2}\phi_1\sin\xi)} d\xi \quad (26a)$$

$$C_1 = 0 \quad (26b)$$

$$S_1 = \frac{i}{\pi}\int_0^{2\pi} \frac{(1-\Delta)\sin(\phi_1\sin\xi)\sin\xi}{\Delta^2 + 4(1-\Delta)\sin^2(\frac{1}{2}\phi_1\sin\xi)} d\xi \quad (26c)$$

The intensities of the output light beams to the respective directions given by the equation (4) are, for $m = 0$, +1 and −1, $$I_0 = |C_0|^2 t^2 I \quad (27a)$$
$$I_1 = \frac{1}{2}(|C_1|^2 + |S_1|^2)t^2 I \quad (27b)$$
$$I_{-1} = \frac{1}{2}(|C_1|^2 + |S_1|^2)t^2 I \quad (27c)$$

Figure 7:
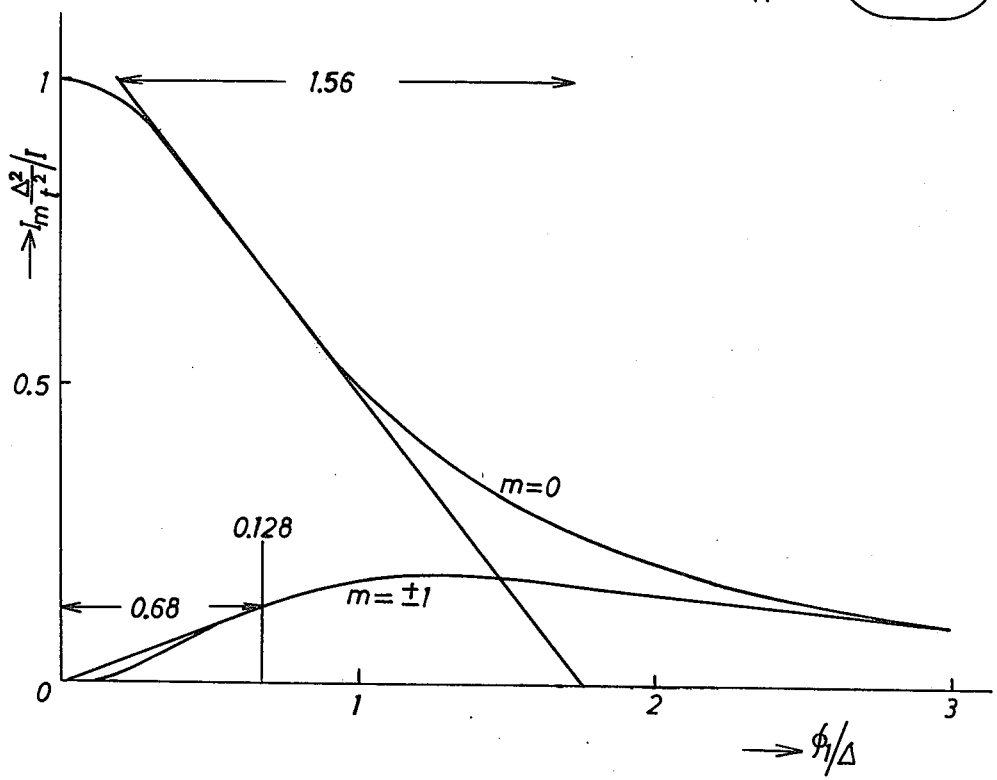
FIG. 7 is a graphical chart representing the modulation response for diffraction orders.

Substitution of the results of numerical integrations of the equations (26) into the equations (27) brings forth the chart of FIG. 7, abscissa showing $\phi_1/\Delta$ and ordinate showing $I_m\Delta^2/It^2$. The maximum gradient of the curve, i.e. the maximum variation rate (modulation sensitivity) of the output light intensity per signal voltage V for $m = \pm 1$ is observed at $\phi_1/\Delta = 0.68$. With a lithium tantalate of $\Delta = 0.005$, $V'_\pi = 1710$ and $t = 0.004$, the voltage is 2.3 volts and the output to input ratio $I_{\pm 1}/I$ is 8%.

As the electrodes in FIG. 6 form a diffraction grating of a pitch $\frac{1}{2}\nu$, the output light components due to diffraction by the electrodes will appear in the directions given by the equation (4) for $m = \pm 2, \pm 4, - - -$, but in the directions for $m = \pm 1$ there will come only scattered light due to defects in the electrooptic crystal 1, the partially transmitting reflector films 13 and 14 and the electrodes 11 and 12. Therefore, the ratio of $I_1$ at V = 0 volt to $I_1$ at V = 2.3 volts (this ratio is referred to as an extinction ratio) becomes sufficiently large. An electrooptic modulator having such a feature is suitable for a pulse modulator.

Figure 8:
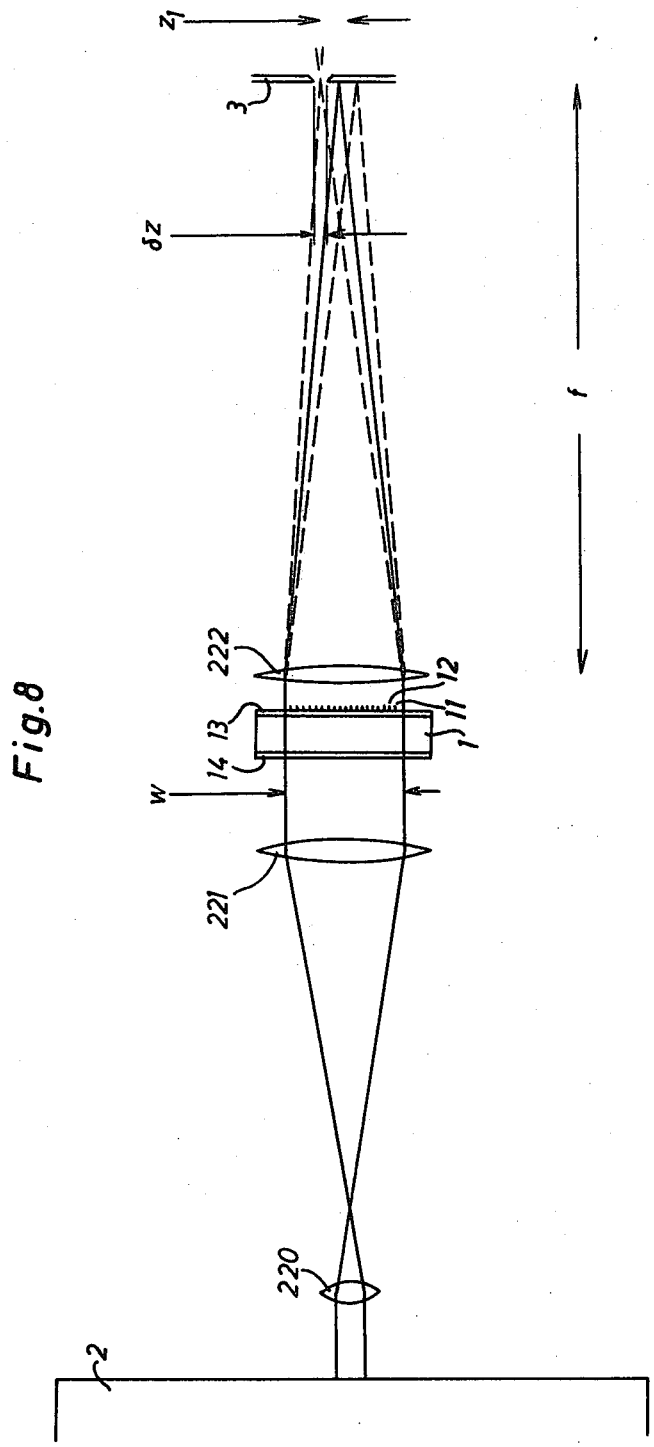
FIG. 8 is a plan view of an embodiment of the electrooptic diffraction modulator according to this invention illustrating the whole light path.

Referring to FIG. 8 is explained means to enter a light beam in the direction to cause multiple interference and means to take out a diffracted component among the output light. A laser emits a coherent light beam, which passes through convex lenses 220 and 221 to become a parallel beam having a width $w$. This beam enters the partially transmitting reflector film 14 with an angle within the tolerable angle $\Delta\theta$ given by the equation (17). As the light beam is repeatedly reflected by the films 13 and 14, the leakages transmitted through the film 13 constitute a resultant light beam whose phase is spatially periodically varied, to be resolved into uniform planewaves respectively propagating in the directions given by the equation (4). These directional components are focused by a convex lens 222 having a focal distance $f$ on its focal plane. The component for $m = 2$ is depicted by solid lines and those for $m = \pm 1$ by broken lines. A slit 3 located on the focal plane of the convex lens 222 selects one (that for $m = +1$) of them to deliver as an output light. As the coherent light beam having a width $w$ is diffracted into a spread of $f\Delta/w$ on the focal plane and an interval between the focal points of the respective diffraction orders has a distance $z_1 = f\nu\Delta$, the width $\delta z$ of the slit should be $$f\Delta/w < \delta z < f\nu\Delta \quad (28)$$

where $w = 2$mm, $\nu = 5$mm$^{-1}$, $\Delta = 0.6 \times 10^{-3}$mm and $f = 500$mm, then $f\Delta/w = 0.15$mm, $f\nu\Delta = 1.5$mm and therefore $\delta z = 0.3$mm will be appropriate for the slit. This embodiment provides a pulse light modulator having a large extinction ratio working with a very low voltage.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An electrooptic modulator comprising:

An electrooptic ferroelectric crystal of $3m$ symmetry having first and second polished plane surfaces defined by rectangular coordinate first and second axes and parallel to each other within one part in one hundredth of an optical wavelength, the crystal c-axis of said crystal being parallel to said first axis;

First and second partially transmitting dielectric multilayer reflecting films integrally deposited on said first and second plane surfaces respectively;

Electrodes provided on said first film to cause in said crystal and subjacent said first film an electrostatic field which is spatially periodic in a direction of said first axis and uniform in a direction of said second axis;

A first means to apply to said electrodes a voltage variable in accordance with a modulating signal; and A second means to couple in said crystal a coherent incident beam of electromagnetic energy with flat-aligned phase planes toward a direction inclined with such an angle to cause multiple interference of said beam by said reflecting films, said crystal delivering different orders of diffracted output beams.

2. An electrooptic modulator as claimed in claim 1 which further comprises:

a third means to selectively pass one of said output beams.

3. An electrooptic modulator as claimed in claim 2, wherein said third means selectively passes only a zero-order output beam.

4. An electrooptic modulator as claimed in claim 2, wherein said third means comprises a conex lens for focusing said diffracted output beams and a slit means located at the focal plane of said convex lens.

* * * * *

UNITED STATES PATENT OFFICE
CERTIFICATE OF CORRECTION

Patent No. 3,923,380            Dated December 2, 1975

Inventor(s) Hattori et al

It is certified that error appears in the above-identified patent and that said Letters Patent are hereby corrected as shown below:

Column 3, line 2, "$\Delta$" should read --$\lambda$--; line 53, "$E_1 \sin 2\pi \nu z$" should read --$\equiv E_1 \sin 2\pi \nu z$--. Column 4, line 40, "$e^1 \phi$" should read --$e^{i\phi}$--; line 43, "$e^{im}\phi$" should read --$e^{im\phi}$--; line 44, "$\phi 0$" should read --$\phi_0$--; line 48, "$\theta = \phi 0$" should read --$\theta = \phi_0$--. Column 5, line 1, "$e^{im\phi O}$" should read --$e^{im\phi_0}$--; line 14, "$t + \dfrac{t^2}{S} + a$" should read --$\dfrac{t^2}{t + S + a}$--; line 21, "$100_0$" should read --$\phi_0$--; line 44, "tranmitted" should read --transmitted--; line 60, "$e^{i \ldots z)}$" should read --$e^{i(\phi_0 + \phi_1 \sin 2\pi \nu z)}$--; line 68, "$\phi 1$" should read --$\phi_1$--. Column 6, line 15, change "$V'^\pi$" should read --$V'_\pi$--; line 51, "$e^{ii}\phi_0 \ldots z)$" should read --$e^{i(\phi_0 + \phi_1 \sin 2\pi \nu z)}$--. Column 8, line 8, "2" should read --0--; lines 13, 15, 17, 20, and 21 (each occurrence) "$\Delta$" should read --$\lambda$--; line 67, "conex" should read --convex--. Column 5, line 5, "$e^{i\phi 0}$" should read -- $e^{i\phi_0}$ --.

Signed and Sealed this

Twenty-fifth Day of October 1977

[SEAL]

Attest:

RUTH C. MASON       LUTRELLE F. PARKER
*Attesting Officer*      *Acting Commissioner of Patents and Trademarks*